US006556926B1

(12) United States Patent
Haines

(10) Patent No.: US 6,556,926 B1
(45) Date of Patent: Apr. 29, 2003

(54) SYSTEM FOR DETERMINING WHEN A COMPONENT IN A PRINTER SHOULD BE REPLACED

(75) Inventor: Robert E. Haines, Boise, ID (US)

(73) Assignee: Hewlett-Packard Development Co., L.P., Houston, TX (US)

( * ) Notice: Subject to any disclaimer, the term of this patent is extended or adjusted under 35 U.S.C. 154(b) by 31 days.

(21) Appl. No.: 09/690,337

(22) Filed: Oct. 16, 2000

(51) Int. Cl.[7] .......................... G01B 3/00; G06F 19/00

(52) U.S. Cl. .......................................... 702/34; 702/33

(58) Field of Search .......................... 702/34, 33, 182, 702/183, 184, 185, 186; 399/16, 18, 19, 24; 347/19, 23

(56) References Cited

U.S. PATENT DOCUMENTS

| | | | | |
|---|---|---|---|---|
| 5,008,711 A | | 4/1991 | Sakamoto et al. | 355/206 |
| 5,155,527 A | | 10/1992 | Gokita et al. | 355/204 |
| 5,404,201 A | | 4/1995 | Umeda et al. | 355/208 |
| 5,771,420 A | | 6/1998 | Suzuki et al. | 399/25 |
| 5,802,146 A | * | 9/1998 | Dulman | 379/32.03 |
| 6,023,593 A | | 2/2000 | Tomidokoro | 399/8 |
| 6,029,145 A | * | 2/2000 | Barritz et al. | 705/34 |
| 6,295,423 B1 | * | 9/2001 | Haines et al. | 399/24 |
| 6,332,062 B1 | * | 12/2001 | Phillips et al. | 399/12 |

FOREIGN PATENT DOCUMENTS

JP 404084170 A 3/1992

OTHER PUBLICATIONS

US pending Application No. 09/480,536; filed Jan. 10, 2000; Robert E. Haines et al; "Printing Device Replaceable Components With Automatic Order Functionality".

* cited by examiner

*Primary Examiner*—Bryan Bui
(74) *Attorney, Agent, or Firm*—Matthew L. Wade

(57) ABSTRACT

A computer is provided that monitors one or more printers over a network in order to determine when new components in each of the printers should be replaced. Each time a printer prints a document, the printer sends a signal to the computer. The computer responds by querying the printer to determine if a components in the printer should be replaced. In addition, each printer is configured to transmit a message to the printer indicating that the component should be replaced. If the computer determines that a component should be replaced, the computer can automatically transmit an order for a new component to a vendor.

11 Claims, 5 Drawing Sheets

SYSTEM FOR DETERMINING WHEN A COMPONENT IN A PRINTER SHOULD BE REPLACED

BACKGROUND OF THE INVENTION

Printers often include components that wear with use and eventually may need to be replaced. For example, laser printers typically include internal rollers for transporting print media, an electrophotographic drum for transferring toner to the print media, a fuser for fusing toner to the print media. All these components wear with use and may need to be replaced, sometimes more than once, during the life of the printer.

Many business have a need to print documents. In fact, the ability to print documents can be a critical requirement in many cases. Accordingly, many businesses own and operate one or more printers and highly value their functionality. Some businesses own and operate a large number of printers.

One problem that can be encountered by these businesses is ensuring that their printers are properly maintained. This involves ensuring that components in their printer are replaced when needed.

Some businesses solve this problem by maintaining a local inventory of replacement printer components that are known to wear out with use. In order to maintain the inventory, the business may assign an employee with the task of ordering new components when needed. In addition, the business may assign an employee with the task of monitoring the printers to determine when components in the printer should be replaced and also to replace the components when needed. Unfortunately, this solution can be expensive and time consuming.

SUMMARY OF THE INVENTION

In one embodiment, the invention is implemented as a method performed by a computer for determining if one or more components in a printer should be replaced. The method preferably includes transmitting a pre-defined query to the printer each time a message is receive indicating the printer has printed a document. The printer is responsive to the query by transmitting to the computer a response. The response indicating whether the component should be replaced. The method further may also include, receiving the response from the printer, evaluating the response to determine if the component should be replaced and transmitting an order for a new component if the response indicates that the component should be replaced.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
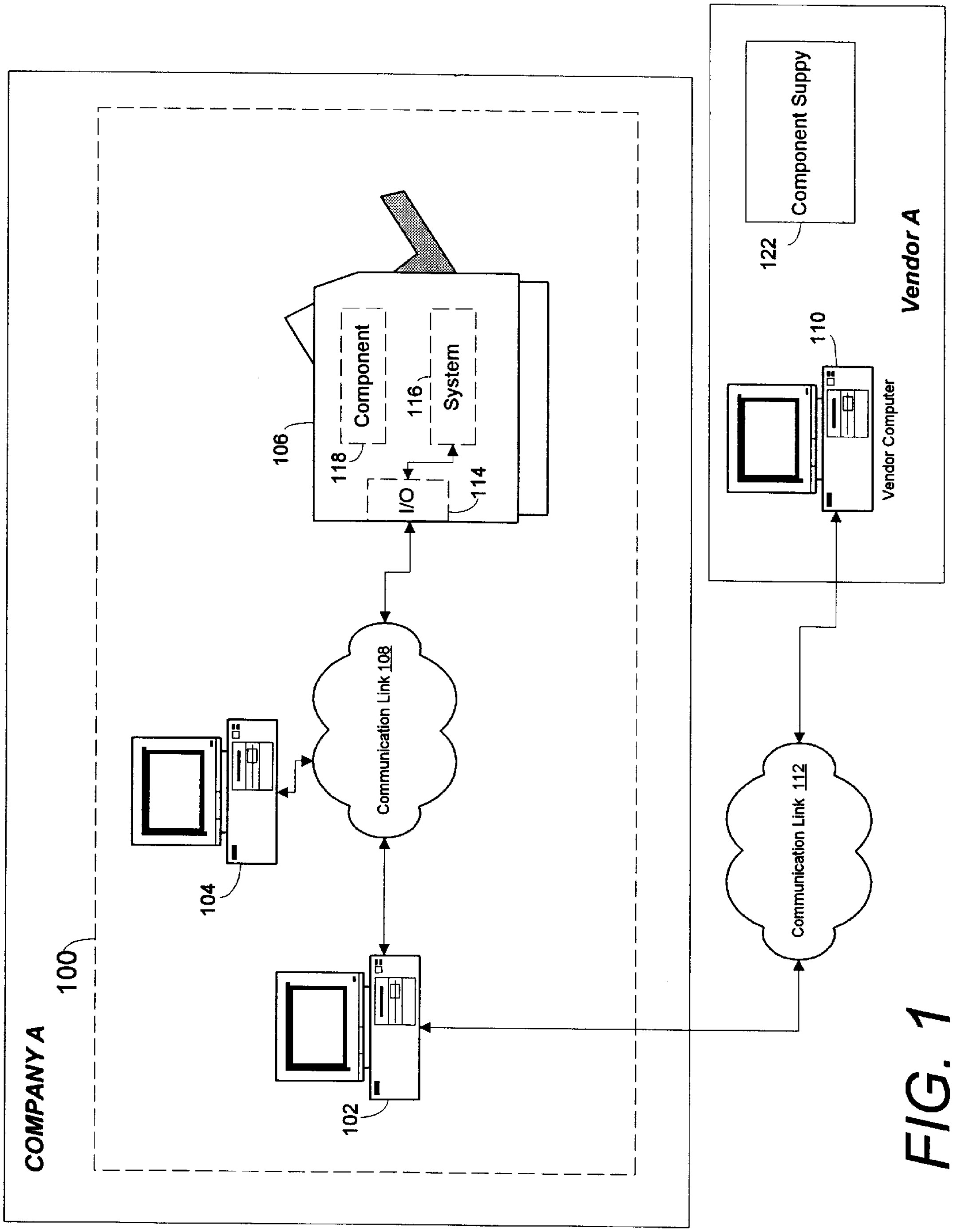
FIG. 1 illustrates an environment where one embodiment of the invention may be used.

FIG. 1 illustrates an environment where one embodiment of the invention may be used. In particular, FIG. 1 shows a computer system 100 that is owned and operated by a company. The company will be referred to as "company A".

The computer system 100 includes a monitoring computer 102, a general purpose computer 104 and a printer 106, all connected to a first communication link 108. As shown, the monitoring computer 102 is also connected to a third computer (vendor computer)110 via a second communication link 112. The second communication link 112 may be a telephone system or some other type of network, such as the INTERNET. The third computer 110 is owned and operated by a vendor. The vendor will be referred to as "Vendor A". In this example, it will be assumed that Vendor A is responsible for servicing the printer 106 for the company A.

The printer 106 includes an I/O port 114, a control system 116 and an internal component 118. The I/O port 114 facilitates communications between the printer 106 and other devices connected to the communications link 108. The control system 116 provides the printer 106 with certain control functionality.

The internal component 118 may represent any component in the printer 106 that is subject to wear over the life of the printer 106. For example, the component 118 may represent any one of the following devices: a fuser for fusing toner to print media, an electrophotographic drum, a roller (or set of rollers) for moving print media, a power supply, a PC board, an ink jet head, etc. It is emphasized that the list just provided is only intended to provide examples and is not exhaustive.

As indicated in FIG. 1, Vendor A maintains a supply of replacement components 122 for the internal component 118.

The general purpose computer 104 can be used to generate a document in an electronic form and to transmit the document (in the form of a print job) to the printer 106. The printer 106 receives the print job over the I/O port 114 and prints the document. It is important to note for the later discussion that each time the printer 106 prints a document, the printer 106 transmits a pre-defined message to the computer 102. For ease of, discussion, this message may be referred to herein as a "job alert" message. A job alert message indicates that the printer 106 has just finished printing a document.

In this example, the printer 106 incorporates the simple network management protocol (SNMP). As well known in the art, SNMP is a widely used protocol for network management and monitoring.

The control system 116 maintains an internal SNMP management information base (MIB) and SNMP agent software. The SNMP agent software functions to manage the MIB and enables the control system 116 to respond to certain SNMP messages received over the I/O port) 14. It is noted for the later discussion that the MIB includes an SNMP object that is referred to as the "component replacement object". In addition, the agent software includes an SNMP trap that is activated when the component replacement object is set. When this trap is activated, a first pre-defined SNMP message is transmitted to the computer 102. For ease of discussion, this message will be referred to herein as a "component replacement message".

It has been determined that the internal component 118 should be replaced when certain criteria are met. In this example, it is assumed that the component 118 should be replaced each time the printer 106 prints “n” pages. When this event occurs, the control system 116 operates to set the component replacement object. As noted above, this results in the component replacement trap being activated and a “component replacement message” being transmitted to the computer 102. It can be seen, therefore, that the “component replacement message” can be used as an indicator that the component 118 should be replaced.

It is also noted that the status of the component replacement object can be determined by the computer 102. This is accomplished by the computer 102 transmitting a predefined query to the printer 106. The printer 106 responds to the query by generating a response indicating whether the component object is set. In this embodiment, both the query and the response to the query are implemented by using SNMP messages. For ease of discussion, the query just described is referred to herein as the “get status” command. The response from the printer 106 is referred to as the “return status” message. It can be seen that the “return status” message can be used as an indicator for determining when the component 118 should be replaced.

Figure 2:
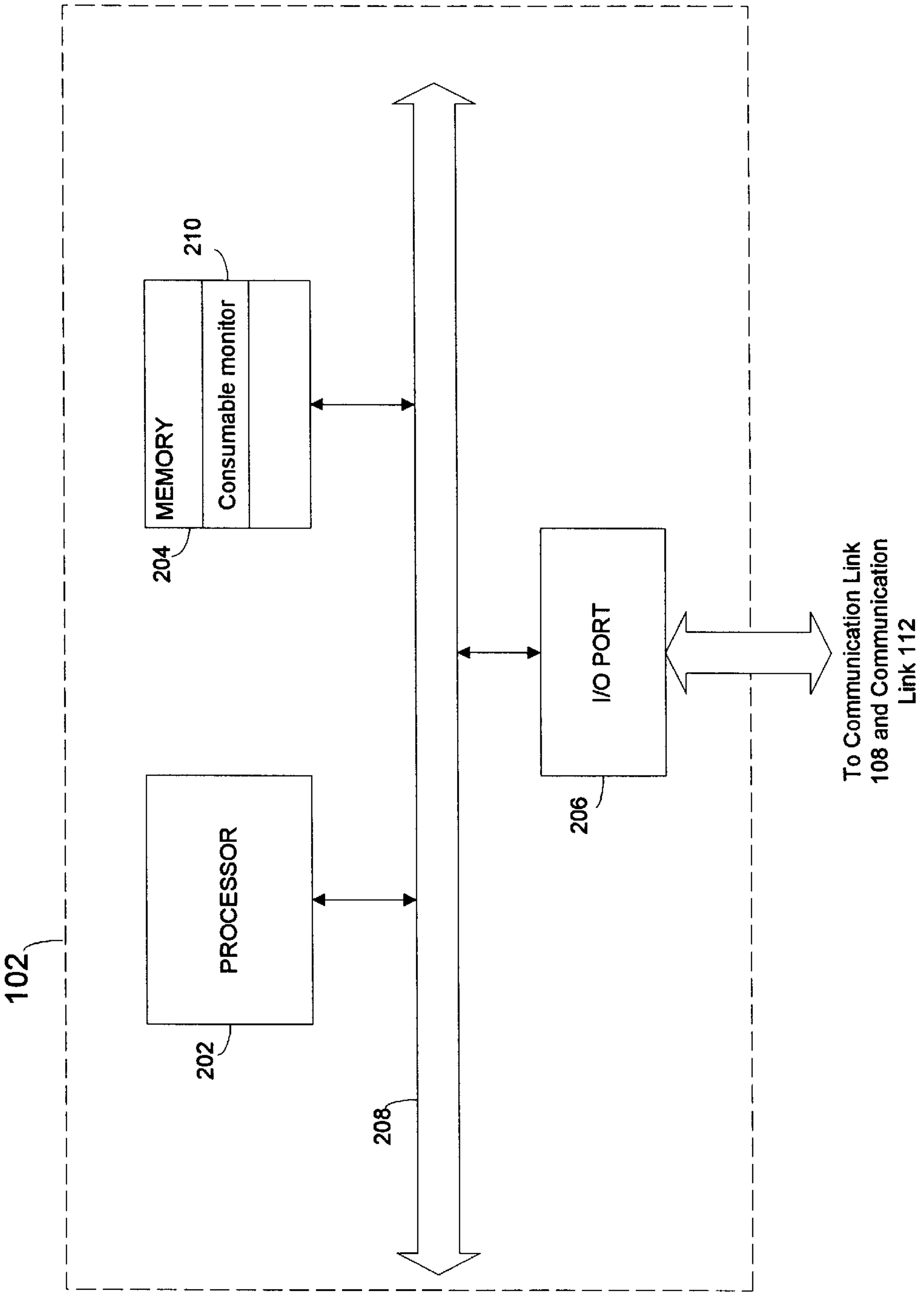
FIG. 2 is a high level block diagram of a computer that monitors a printer.

FIG. 2 is a high level block diagram of the computer 102. As shown, the computer 102 includes a processor 202, a memory 204 and an I/O port 206 all connected by a local interface 208. The memory 204 is used to store programs and may include both volatile and nonvolatile memory components. The processor 202 is used to execute the programs stored in the memory 204. As shown, one of these programs is designated a “component monitoring” program 210. The component monitoring program 210 directs the computer 102 to perform a series of steps. These steps are illustrated in FIG. 3.

Figure 3:
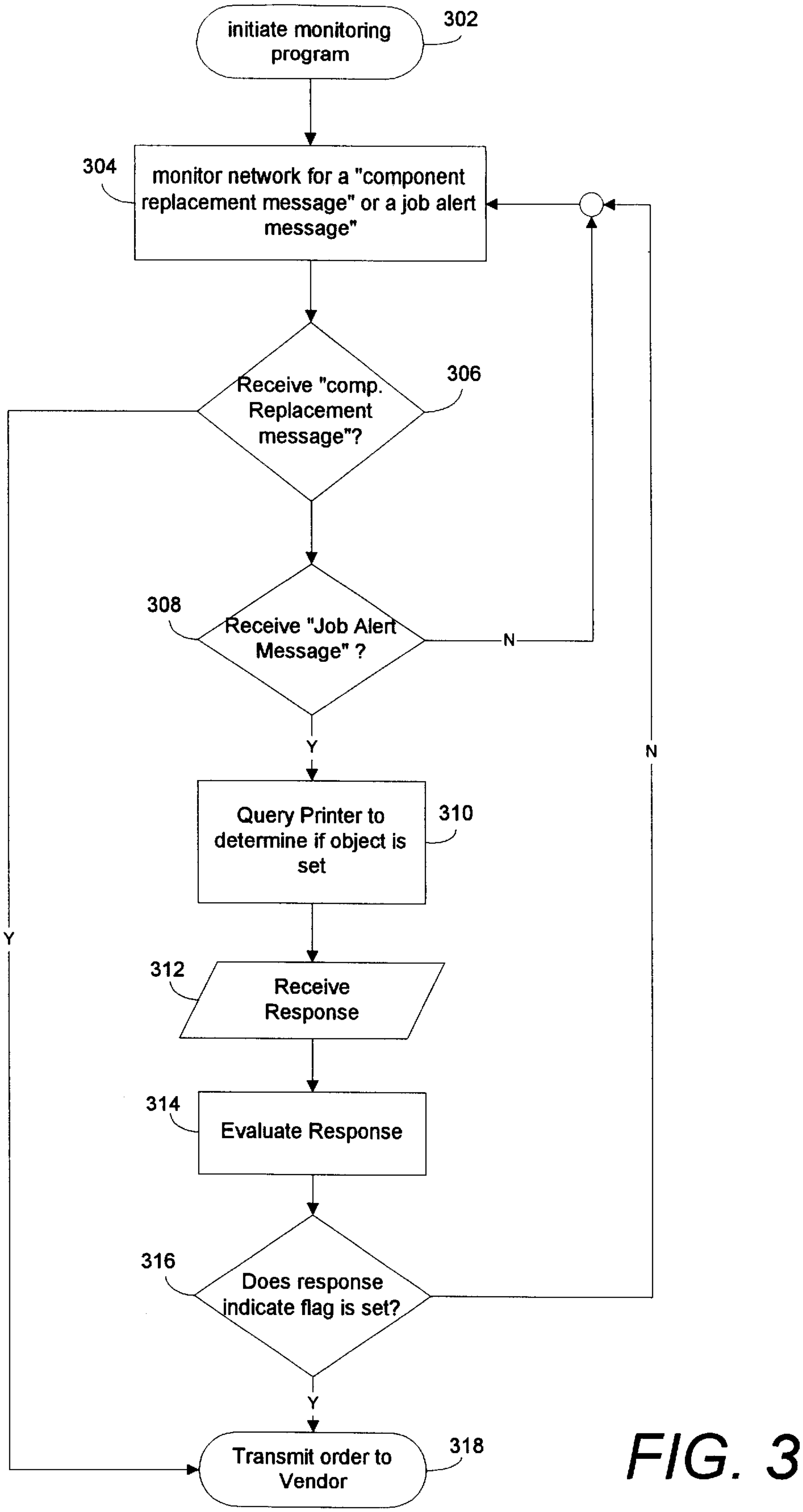
FIG. 3 is a flow chart illustrating the steps followed by the computer to monitor the printer.

FIG. 3 is a flow chart illustrating the steps performed by the computer 102 while operating under the direction of the component monitoring program 210. As indicated, upon the monitoring program 210 being initiated, the computer 102 begins to monitor the printer 106 over the first communication link 108 for a “component replacement message” or a “job alert message” (step 304).

If the computer 102 detects that a “component replacement message” (decision step 306) has been received from the printer 106 (decision step 306), the computer 102 responds by transmitting, over the communication link 112, an order for a replacement component to the vendor computer 110.

If, while monitoring the network 108, the computer 102 detects that a job alert message has been received from the printer 106 (decision step 308), the computer 102 responds by transmitting a “get status” command to the printer 106 (step 310).

As discussed above, the printer 106 responds to the “get status” command by transmitting back a “return status” message. The computer 102 receives this response at step 312.

Next, the computer 102 evaluates the “return status” message received at step 312 to determine if the component 118 should be replaced (step 314). If it is determined that the component does not need to be replaced (decision step 316), then the computer 102 continues to monitor the network 108 as previously described (step 304).

If, however, the computer 102 determines that the component 118 should be replaced, then the computer 102 transmits an order to vendor A for a replacement component (step 318).

In this embodiment, the computer 102 performs step 318 by transmitting a message over the second communication link 112 to the vendor computer 120. The message may include payment information, a shipping address, the identity of the printer 106, etc. The vendor computer 110 receives and logs the order.

According to one service model, vendor A responds to the new order by shipping a replacement component to Company A. After Company A receives the replacement component, an employee of Company A installs it in the printer 106. Alternatively, an employee of the Vendor A can be dispatched to Company A to deliver, as well as install, the replacement component.

The reader will see that, in the present embodiment, there are two ways that the computer 102 can determine that the internal component 118 should be replaced. First, the computer 102 can detect a component replacement message from the printer 106. Second, the computer 102 can query the printer 106 in order to receive a response that indicates the component 118 should be replaced.

It is important to note that these two ways are redundant. In the present embodiment, this redundancy is considered desirable, however, as it is considered possible that the computer 102 may fail to detect the component replacement message as it is an unsolicited message sent from the printer 106 and is sent only once.

From the foregoing, it will be appreciated that the present invention provides a novel and advantageous system for monitoring the status of one or more components in a printer. A system according to the invention can operate to determine when a component in a printer needs to be replaced and can automatically place orders for new components with a vendor. It can readily be seen that this reduces the need for a business to maintain a local inventory of replacement components.

It is important to note that a computer according to the invention may be used to monitor more than one printer. For example, in the embodiment just described there may be additional printers connected to the first communication link 108. In that case, the computer 102 can be configured to monitor these additional printers in a similar manner and to place orders for replacement components for these printers as needed. Additionally, a computer according to the invention may determine when more than one component in a printer should be replaced and can place orders for these other components.

Figure 4:
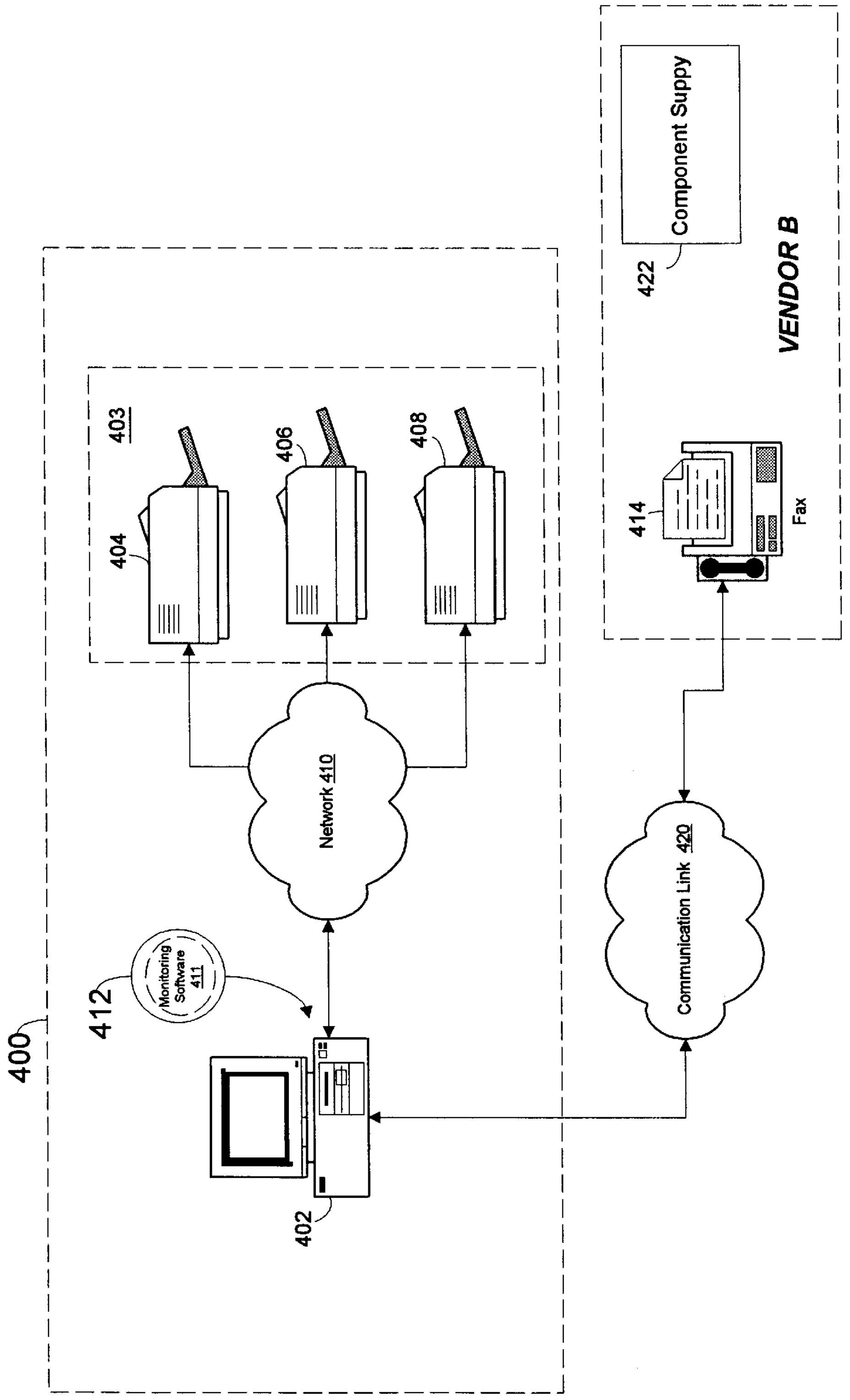
FIG. 4 illustrates a second environment where a second exemplary embodiment of the invention may be used.

FIG. 4 illustrates a second exemplary embodiment of the invention. in particular, FIG. 4 shows a computer system 400. The computer system 400 includes a computer 402 and a group of printers 403 all connected to a network 410. The network may represent any suitable communication system, such as the INTERNET or a local Intranet. The group of printers 403 includes a first printer 404, a second printer 406 and a third printer 408.

The computer 402 is also connected to a facsimile machine 414 by a communication link 420. The facsimile machine 414 is owned and operated by a vendor, vendor B. Vendor B maintains a supply of printer components 422.

Each one of the printers shown is responsive to receiving a predefined query from the computer 402 by generating and then transmitting to the computer 402 a response. For ease of discussion, the query is referred to as the “get status command”. The response is referred to as the “return status message”.

Importantly, the “return status message” provides information that can be used by the computer 402 to determine whether certain components in the printer should be replaced. For example, the return status message may indicate the number of pages (page count) that have been printed. In this case, the computer 402 may store the page count value when the component was first installed. The computer 402 then compares this value to the page count value indicated by the return status message. If the difference in page count is above some pre-determined threshold number, then it is determined (by the computer 402) the component should be replaced. In other examples, the printer(s) is an inkjet printer and the component being monitored is an inkjet head. Furthermore, it has been determined that the inkjet head should be replaced after being used to discharge a certain number of ink drops ("drop_count_max"). In this case, the computer 402 stores the number of drops (drop_count_old) when the inkjet head is first installed. The return status message indicates the present drop count (drop_count_present) The computer 402 determines that the inkjet head should be replaced if the following relationship is true: drop_count_max>(drop_count_present-drop_count_old)

In addition, each time a printer from the group of printers 403 prints a document, the printer sends a pre-defined message to the computer 402. For ease of discussion, this message will also be referred to a "job alert message". The job alert message includes information that identifies the printer that sent it and indicates that the printer just printed a document.

During the set-up of the computer 402, a component monitoring program 411 is loaded into the local memory of the computer 402 from a program storage medium 412.

The monitoring program 411 is executable by the computer 402 to perform certain steps for monitoring the group of printers 403 over the network 410 in order to determine when one or more components in each printer should be replaced. The components that are monitored may be, for example, a fuser, print roller, electrophotographic drum, or any other component that wears with use.

Figure 5:
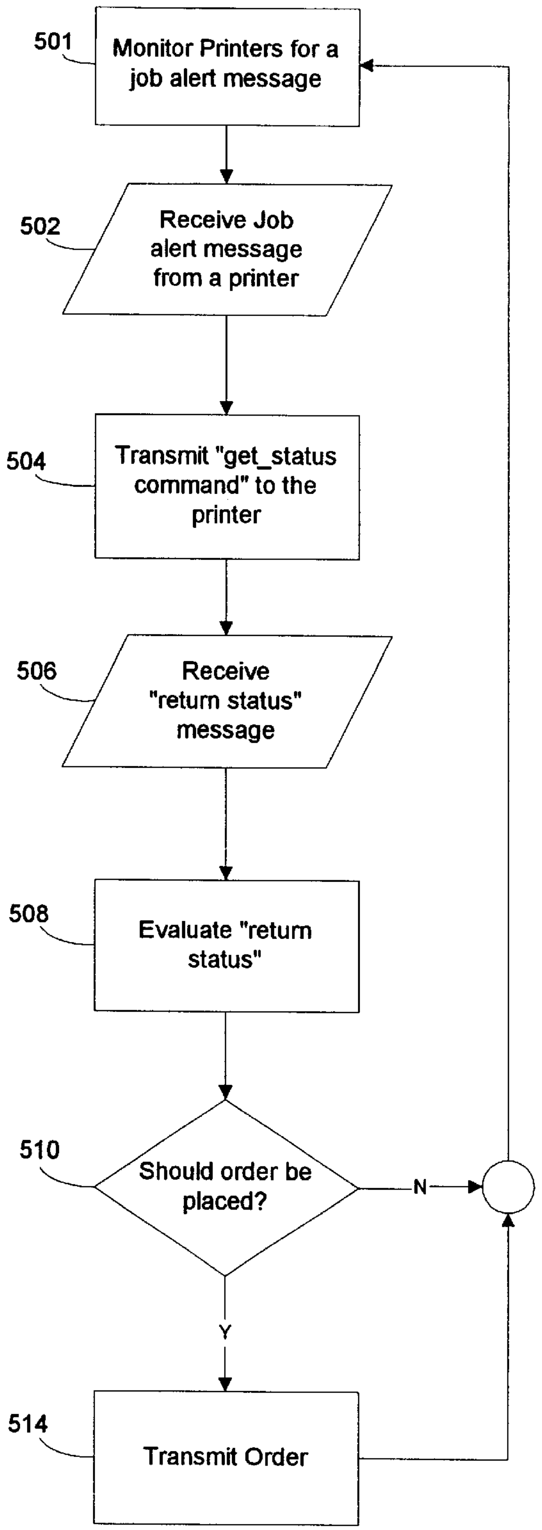
FIG. 5 is a flow chart illustrating the steps followed by a computer to monitor a group of printers.

FIG. 5 illustrate the operation of the computer 402 while executing the monitoring program 411. First, the computer 402 begins to monitor the network 410 for a job alert message (step 501). The computer 402 receives a job alert message from one of the printers at step 502. For ease of discussion, the printer that sends this message will be referred to herein as the "target printer". The target printer may be any printer from the group of printers 403.

In response to receiving the job alert message at step 502, the computer 402 identifies the target printer and responds by transmitting a "get status" command to the target printer (step 504).

The computer 402 then receives a response to this message (i.e., a return status message) at step 506. Next, the computer 402 evaluates the "return status message" to determine if one or more components in the target printer should be replaced (step 508). If the computer 402 determines that an order should not be placed (decision step 510), then the computer 402 continues to monitor the printers 403 for a job alert message (step 501).

If, however, the computer 102 determines that an order should be placed, then the computer 402 transmits an order for one or more new components to Vendor B (step 514). In this example, this step is accomplished by the computer 402 transmitting a FAX message over the communication link 420 to the facsimile machine 414. The FAX message may include payment information, the identity of the target printer, etc.

After the order is transmitted, the computer 402 continues to monitor the printers 103 for a job alert message (step 501).

It is noted that in the embodiments just described, the functionality provided by the component monitoring program may alternatively be provided in whole or in part by hardware components. For example, one or more of the steps illustrated in FIG. 3 of FIG. 5 could be performed by operation of an application specific integrated circuit having appropriate logic gates, a programmable gate array (s) (PGA) or a field programmable gate array (FPGA).

It is also noted that in alternative embodiments of the present invention, the steps indicated in FIG. 3 may occur out of the order indicated in the figure, or steps may be performed concurrently or with partial concurrence.

As illustrated in FIG. 2 and FIG. 4, the present invention may also be embodied in the form a program storage medium having computer readable program code embodied therein for causing a computer to perform one or more of the steps indicated in FIG. 3 and FIG. 5. In the context of this document, "program storage medium" can be any means that can contain, store, communicate, propagate, or transport the program for use by or in connection with an instruction execution system, apparatus or device. The program storage medium can be, for example (the following is a non-exhaustive list), a magnetic, optical, or semiconductor based storage device.

Additionally, although specific embodiments of the invention have been described and illustrated, the invention is not to be limited to the specific forms or arrangements of parts so described and illustrated. For example, in alternative embodiments, the computer that monitors the printer(s) may be owned and operated by a vendor responsible for replacing the components. In fact, the computer may physically reside on the vendor's premises and operate to monitor one or more printers over the Internet. Accordingly, the invention is limited only by the claims and equivalents thereof.

What is claimed is:

1. A computer implemented method, comprising:

(a) receiving, by a computer, a job alert message from a printer that includes a replaceable component; and (b) in response to receiving the job alert message, automatically determining, by the computer, if a replacement for the component should be ordered; and (c) in response to determining that the replacement should be ordered, automatically placing, by the computer, an order for the replacement with a vendor.

2. A computer for monitoring a printer to determine when a component in the printer should be replaced, comprising:

(a) means for receiving a first message from the printer indicating the printer has printed a document; and (b) means for responding to the first message by determining if a replacement for the component should be ordered; and (c) means for automatically placing an order for the replacement in response to the responding means determining that the replacement should be ordered.

3. The computer of claim 2, wherein the first component is a fuser.

4. The computer of claim 2, wherein the first component is a print roller.

5. The computer of claim 2, wherein the first component is an electrophotographic drum.

6. The computer of claim 2, wherein the first component is an inkjet print head.

7. A program storage medium readable by a computer, tangibly embodying a program of instruction executable by the computer to perform method steps for monitoring a group of printers over a network to determine when a component in each of the printers is to be replaced, the method steps comprising:

(a) receiving a message from a printer, the printer being from the group of printers, the message indicating the printer has performed a function associated with printing a document; and (b) automatically responding to the message by determining if a component in the printer should be replaced;

(c) automatically transmitting an order to a vendor if it is determined that the component in the printer should be replaced; and wherein the order is for a replacement of the component.

8. The program storage medium of claim 7, wherein the component includes a printer roller.

9. The program storage medium of claim 7, wherein the component is a fuser.

10. The program storage medium of claim 7, wherein the component is an electrophotographic drum.

11. The program storage medium of claim 7, wherein the component is an inkjet printhead.

* * * * *